US012779318B2

(12) United States Patent
Yarbrough et al.

(10) Patent No.: US 12,779,318 B2
(45) Date of Patent: *Nov. 3, 2026

(54) SYSTEM AND METHOD FOR PRESENTING A GAME OF CHANCE WITH A PROGRESSIVE JACKPOT

(71) Applicant: Video Gaming Technologies, Inc., Franklin, TN (US)

(72) Inventors: Jon Yarbrough, Franklin, TN (US); Ryan Cuddy, Reno, NV (US); Mike Oberberger, Spring Hill, TN (US)

(73) Assignee: Video Gaming Technologies, Inc., Franklin, TN (US)

( * ) Notice: Subject to any disclaimer, the term of this patent is extended or adjusted under 35 U.S.C. 154(b) by 127 days.

This patent is subject to a terminal disclaimer.

(21) Appl. No.: 18/967,089

(22) Filed: Dec. 3, 2024

(65) Prior Publication Data

US 2025/0090939 A1 Mar. 20, 2025

Related U.S. Application Data

(63) Continuation of application No. 18/504,926, filed on Nov. 8, 2023, now Pat. No. 12,214,286, which is a (Continued)

(51) Int. Cl.

*A63F 3/06* (2006.01)
*G07F 17/32* (2006.01)

(52) U.S. Cl.

CPC ................ *A63F 3/06* (2013.01); *A63F 3/062* (2013.01); *A63F 3/0645* (2013.01); *G07F 17/3258* (2013.01)

(58) Field of Classification Search

CPC .......... A63F 3/06; A63F 3/062; A63F 3/0645; G07F 17/3258

See application file for complete search history.

(56) References Cited

U.S. PATENT DOCUMENTS

| | | | |
|---|---|---|---|
| 5,072,381 | A | 12/1991 | Richardson |
| 5,275,400 | A | 1/1994 | Weingardt |

(Continued)

FOREIGN PATENT DOCUMENTS

| | | | |
|---|---|---|---|
| WO | 03063019 | A1 | 7/2003 |
| WO | 2008067596 | A1 | 6/2008 |

OTHER PUBLICATIONS

"Technical Standards for Gaming Devices and On-Line Slot Systems." Nevada Gaming Commission. Adopted May 22, 2003. 20 pages.

(Continued)

*Primary Examiner* — William H McCulloch, Jr.
(74) *Attorney, Agent, or Firm* — Armstrong Teasdale LLP

(57) ABSTRACT

A gaming machine receives a first play input at a first gaming machine, determines a first quantity of play areas based on a first wager, generates at least one first play area based on the determined first quantity, and determines whether the at least one first play area satisfies a predetermined first threshold. At least a portion of the first wager associated with the first play input is allocated to a progressive jackpot. At least a first portion of the progressive jackpot is allocated to the first gaming machine when the at least one first play area satisfies the predetermined first threshold.

20 Claims, 5 Drawing Sheets

Related U.S. Application Data continuation of application No. 18/079,553, filed on Dec. 12, 2022, now Pat. No. 11,850,526, which is a continuation of application No. 17/235,681, filed on Apr. 20, 2021, now Pat. No. 11,534,678, which is a continuation of application No. 16/673,694, filed on Nov. 4, 2019, now Pat. No. 10,994,192, which is a continuation of application No. 14/602,771, filed on Jan. 22, 2015, now Pat. No. 10,463,949.

(56) References Cited

U.S. PATENT DOCUMENTS

| | | | | |
|---|---|---|---|---|
| 5,564,700 | A | 10/1996 | Celona | |
| 5,645,486 | A | 7/1997 | Nagao | |
| 6,142,872 | A | 11/2000 | Walker | |
| 6,146,271 | A | 11/2000 | Kadlic | |
| 6,244,958 | B1 | 6/2001 | Acres | |
| 6,398,645 | B1 | 6/2002 | Yoseloff | |
| 6,589,115 | B2 | 7/2003 | Walker | |
| 6,752,312 | B1 | 6/2004 | Chamberlain | |
| 7,442,123 | B2 | 10/2008 | Brill | |
| 7,481,707 | B1 | 1/2009 | Luciano, Jr. | |
| 7,500,914 | B2 | 3/2009 | Rodgers | |
| 7,604,540 | B2 | 10/2009 | Olive | |
| 7,614,948 | B2 | 11/2009 | Saffari | |
| 7,819,742 | B2 | 10/2010 | Chamberlain | |
| 7,862,427 | B2 | 1/2011 | Nguyen | |
| 7,959,507 | B2 | 6/2011 | Cannon | |
| 8,231,458 | B2 | 7/2012 | Baerlocher | |
| 8,241,103 | B2 * | 8/2012 | Yarbrough | G07F 17/32 463/19 |
| 8,323,096 | B2 | 12/2012 | Tomei | |
| 8,333,656 | B2 | 12/2012 | Vaughan | |
| 8,360,864 | B2 | 1/2013 | Dickerson | |
| 8,444,476 | B2 | 5/2013 | Johnson | |
| 8,460,082 | B2 | 6/2013 | Harris | |
| 8,523,662 | B2 | 9/2013 | Brune | |
| 8,550,894 | B2 | 10/2013 | Lange | |
| 8,808,081 | B1 | 8/2014 | Healy | |
| 8,858,322 | B2 | 10/2014 | Hayden | |
| 8,956,216 | B1 | 2/2015 | Lesourd | |
| 9,317,991 | B2 | 4/2016 | Macbeth | |
| 9,327,185 | B2 | 5/2016 | Elias | |
| 9,401,074 | B2 | 7/2016 | Macbeth | |
| 9,652,930 | B2 | 5/2017 | Macbeth | |
| 9,691,227 | B2 | 6/2017 | Yarbrough | |
| 9,786,129 | B2 | 10/2017 | Travis | |
| 9,792,771 | B2 | 10/2017 | Khal | |
| 9,830,780 | B2 | 11/2017 | Cuddy | |
| 9,875,620 | B2 | 1/2018 | Cuddy | |
| 9,916,735 | B2 | 3/2018 | Chun | |
| 10,269,220 | B2 | 4/2019 | Harpur | |
| 10,463,949 | B2 | 11/2019 | Yarbrough | |
| 10,810,840 | B2 | 10/2020 | Casey | |
| 10,867,469 | B2 | 12/2020 | Ceniceroz | |
| 10,867,482 | B2 | 12/2020 | Smith | |
| 10,994,192 | B2 | 5/2021 | Yarbrough | |
| 11,534,678 | B2 | 12/2022 | Yarbrough | |
| 11,823,535 | B2 | 11/2023 | Hoover | |
| 11,850,526 | B2 | 12/2023 | Yarbrough | |
| 12,214,286 | B2 * | 2/2025 | Yarbrough | A63F 3/06 |
| 2001/0031659 | A1 | 10/2001 | Perrie | |
| 2002/0043759 | A1 | 4/2002 | Vancura | |
| 2002/0045474 | A1 | 4/2002 | Singer | |
| 2003/0027626 | A1 | 2/2003 | Marks | |
| 2003/0064807 | A1 | 4/2003 | Walker | |
| 2003/0104854 | A1 | 6/2003 | Cannon | |
| 2003/0181231 | A1 | 9/2003 | Vancura | |
| 2004/0029632 | A1 | 2/2004 | Colton | |
| 2004/0198481 | A1 | 10/2004 | Herrington | |
| 2004/0235555 | A1 | 11/2004 | Yarbrough | |
| 2005/0037832 | A1 | 2/2005 | Cannon | |
| 2005/0059449 | A1 | 3/2005 | Yarbrough | |
| 2005/0059466 | A1 | 3/2005 | Yarbrough | |
| 2005/0187014 | A1 | 8/2005 | Saffari | |
| 2006/0035700 | A1 | 2/2006 | Van Asdale | |
| 2006/0035707 | A1 | 2/2006 | Nguyen | |
| 2006/0189371 | A1 | 8/2006 | Walker | |
| 2006/0205477 | A1 | 9/2006 | Fisk | |
| 2006/0211471 | A1 | 9/2006 | Walker | |
| 2007/0298873 | A1 | 12/2007 | Nguyen | |
| 2008/0039191 | A1 | 2/2008 | Cuddy | |
| 2008/0090651 | A1 | 4/2008 | Baerlocher | |
| 2008/0161105 | A1 | 7/2008 | Mishra | |
| 2009/0011814 | A1 | 1/2009 | Lozano | |
| 2009/0075714 | A1 | 3/2009 | Meyer | |
| 2009/0124385 | A1 | 5/2009 | Cuddy | |
| 2010/0124979 | A1 | 5/2010 | Acres | |
| 2010/0323776 | A1 | 12/2010 | Cuddy | |
| 2011/0028201 | A1 | 2/2011 | Warner | |
| 2011/0230249 | A1 | 9/2011 | Harris | |
| 2011/0287823 | A1 | 11/2011 | Guinn | |
| 2012/0172103 | A1 | 7/2012 | Gurule | |
| 2012/0231867 | A1 | 9/2012 | Dimitriadis | |
| 2012/0231868 | A1 | 9/2012 | Guinn | |
| 2013/0023324 | A1 | 1/2013 | Lange | |
| 2013/0130778 | A1 | 5/2013 | Anderson | |
| 2013/0296060 | A1 | 11/2013 | Hayden | |
| 2014/0197598 | A1 | 7/2014 | King | |
| 2014/0274278 | A1 | 9/2014 | Elias | |
| 2014/0274279 | A1 | 9/2014 | Macbeth | |
| 2014/0274280 | A1 | 9/2014 | Macbeth | |
| 2015/0209658 | A1 | 7/2015 | Elias | |
| 2015/0213672 | A1 | 7/2015 | Elias | |
| 2015/0213673 | A1 | 7/2015 | Elias | |
| 2015/0221162 | A1 | 8/2015 | Peters | |
| 2016/0210809 | A1 | 7/2016 | Elias | |
| 2016/0210810 | A1 | 7/2016 | Macbeth | |
| 2016/0217656 | A1 | 7/2016 | Yarbrough | |
| 2016/0300427 | A1 | 10/2016 | Elias | |
| 2016/0314650 | A1 | 10/2016 | Macbeth | |
| 2016/0346674 | A1 | 12/2016 | Elias | |
| 2017/0213414 | A1 | 7/2017 | Harpur | |
| 2017/0270740 | A1 | 9/2017 | Yarbrough | |
| 2017/0278340 | A1 | 9/2017 | Khal | |
| 2018/0102027 | A1 | 4/2018 | Paiva | |
| 2020/0061451 | A1 | 2/2020 | Yarbrough | |
| 2021/0236914 | A1 | 8/2021 | Yarbrough | |
| 2023/0106260 | A1 | 4/2023 | Yarbrough | |
| 2024/0066389 | A1 | 2/2024 | Yarbrough | |
| 2025/0090939 | A1 * | 3/2025 | Yarbrough | A63F 3/0645 |

OTHER PUBLICATIONS

Office Action dated Oct. 6, 2020 for U.S. Appl. No. 16/673,694 (pp. 1-6).

Notice of Allowance dated Jan. 22, 2021 for U.S. Appl. No. 16/673,694 (pp. 1-5).

Office Action (Non-Final Rejection) dated May 12, 2022 for U.S. Appl. No. 17/235,681 (pp. 1-6).

Office Action (Notice of Allowance and Fees Due (PTOL-85)) dated Aug. 25, 2022 for U.S. Appl. No. 17/235,681 (pp. 1-5).

Office Action (Notice of Allowance and Fees Due (PTOL-85)) dated Aug. 15, 2023 for U.S. Appl. No. 18/079,553 (pp. 1-7).

Notice of Allowance dated Sep. 27, 2024 for U.S. Appl. No. 18/504,926 (pp. 1-10).

* cited by examiner

SYSTEM AND METHOD FOR PRESENTING A GAME OF CHANCE WITH A PROGRESSIVE JACKPOT

CROSS REFERENCE TO RELATED APPLICATIONS

This application is a continuation application of U.S. patent application Ser. No. 18/504,926, filed Nov. 8, 2023, which is a continuation application of U.S. patent application Ser. No. 18/079,553, filed Dec. 12, 2022, which is a continuation application of U.S. patent application Ser. No. 17/235,681, filed Apr. 20, 2021, now U.S. Pat. No. 11,534,678, which is a continuation application of U.S. patent application Ser. No. 16/673,694, filed Nov. 4, 2019, now U.S. Pat. No. 10,994,192, which is a continuation application of U.S. patent application Ser. No. 14/602,771, filed Jan. 22, 2015, now U.S. Pat. No. 10,463,949, the entire contents and disclosures of which are hereby incorporated by reference in their entirety.

BACKGROUND

The field of the disclosure relates generally to gaming systems, and, more particularly, to methods and systems for presenting a game of chance with a progressive jackpot.

At least some known gaming machines present a game of chance with a progressive jackpot that incrementally grows as players play gaming machines linked to the progressive jackpot. At least some known gaming machines determine whether the player wins a base game and whether the player wins the progressive jackpot based on the same criteria. Moreover, many known progressive jackpots are linked to a common type or class of gaming machine.

BRIEF SUMMARY

In one aspect, a method is provided for presenting a game of chance on a gaming machine. The method includes receiving a first play input at a first gaming machine, determining a first quantity of play areas based on a first wager, generating at least one first play area based on the determined first quantity, and determining whether the at least one first play area satisfies a predetermined first threshold. At least a portion of the first wager associated with the first play input is allocated to a progressive jackpot. At least a first portion of the progressive jackpot is allocated to the first gaming machine when the at least one first play area satisfies the predetermined first threshold.

In another aspect, one or more non-transitory computer-readable storage media having computer-executable instructions embodied thereon is provided. When executed by at least one processor, the computer-executable instructions cause the at least one processor to receive a first play input at a first gaming machine, determine a first quantity of play areas based on a first wager, generate at least one first play area based on the determined first quantity, and determine whether the at least one first play area satisfies a predetermined first threshold. At least a portion of the first wager associated with the first play input is allocated to a progressive jackpot. At least a first portion of the progressive jackpot is allocated to the first gaming machine when the at least one first play area satisfies the predetermined first threshold.

In yet another aspect, a gaming machine is provided. The gaming machine includes a frame, and a gaming controller coupled to the frame. The gaming controller includes at least one processor, and one or more non-transitory computer-readable storage media having computer-executable instructions embodied thereon. When executed by the at least one processor, the computer-executable instructions cause the at least one processor to receive a first play input at a first gaming machine, determine a first quantity of play areas based on a first wager, generate at least one first play area based on the determined first quantity, and determine whether the at least one first play area satisfies a predetermined first threshold. At least a portion of the first wager associated with the first play input is allocated to a progressive jackpot. At least a first portion of the progressive jackpot is allocated to the first gaming machine when the at least one first play area satisfies the predetermined first threshold.

In yet another aspect, a method is provided for presenting a game of chance on a gaming machine. The method includes receiving a play input at the gaming machine, determining a quantity of progressive play areas based on a wager, generating at least one progressive play area based on the determined quantity, and determining whether the at least one progressive play area satisfies a first predetermined progressive threshold. At least a portion of the wager associated with the play input is allocated to a progressive jackpot. At least a first portion of the progressive jackpot is allocated to the gaming machine when the at least one progressive play area satisfies the first predetermined progressive threshold.

The features, functions, and advantages described herein may be achieved independently in various embodiments of the present disclosure or may be combined in yet other embodiments, further details of which may be seen with reference to the following description and drawings.

BRIEF DESCRIPTION OF THE DRAWINGS

FIG. 1 is a schematic diagram of an example gaming machine;

FIG. 2 is a schematic block diagram of an example gaming network including a plurality of the gaming machines shown in FIG. 1;

FIG. 3 is a schematic block diagram of an example computing device that may be used with the gaming machine shown in FIG. 1;

FIG. 4 includes a schematic illustration of an example play area; and

FIG. 5 is a flowchart of an example method for presenting a game of chance using the computing device shown in FIG. 3.

Figure 1:
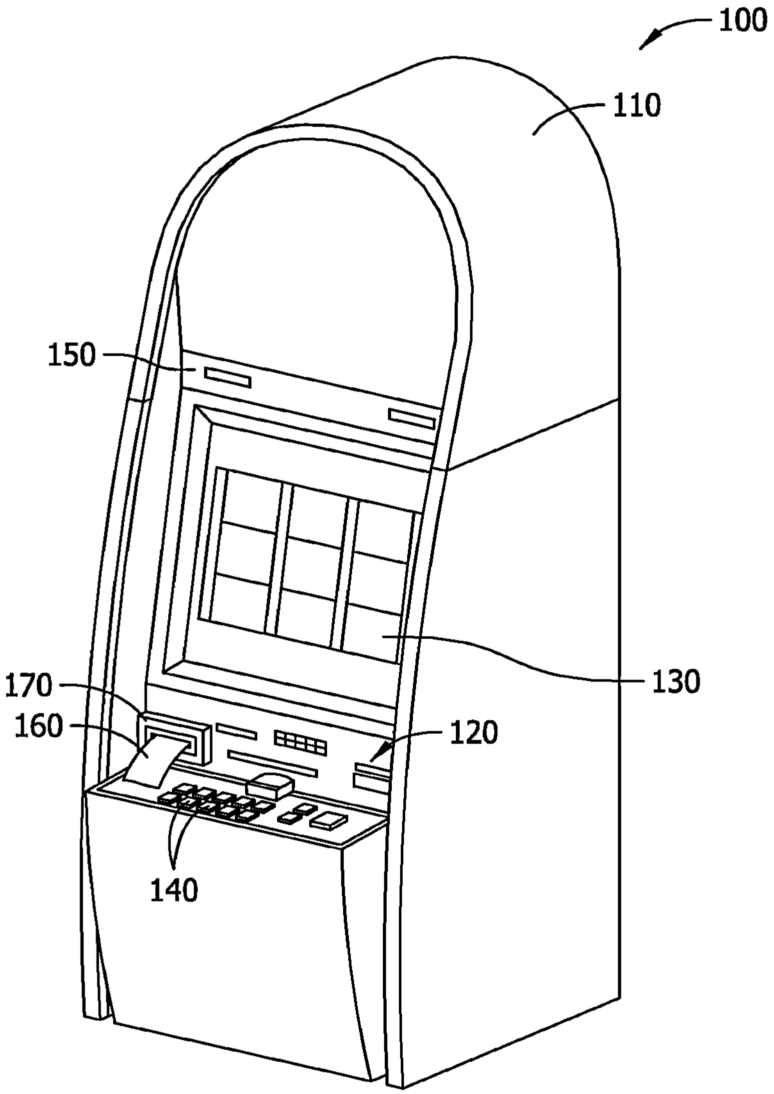
FIGS. 1-5 show example embodiments of the method and system described herein.

Although specific features of various embodiments may be shown in some drawings and not in others, such illustrations are for convenience only. Any feature of a drawing may be referenced and/or claimed in combination with any feature of any other drawing. Corresponding reference characters indicate corresponding parts throughout the several views of the drawings.

DETAILED DESCRIPTION

Example embodiments of systems and methods for use in providing a game of chance are described herein. In one embodiment, a gaming machine receives a first play input at a first gaming machine, determines a first quantity of play areas based on a first wager, generates at least one first play area based on the determined first quantity, and determines whether the at least one first play area satisfies a predetermined first threshold. At least a portion of the first wager associated with the first play input is allocated to a progressive jackpot. At least a first portion of the progressive jackpot is allocated to the first gaming machine when the at least one first play area satisfies the predetermined first threshold. Accordingly, the embodiments described herein enable the gaming device to participate in a common progressive jackpot.

The methods and systems described herein may be implemented using computer programming or engineering techniques including computer software, firmware, hardware, or any combination or subset thereof, wherein the technical effects may be achieved by performing at least one of the following steps: (a) receiving a play input; (b) determining whether a primary game satisfies a predetermined threshold; (c) determining a quantity of secondary play areas based on a wager associated with the play input; (d) generating at least one secondary play area based on the determined quantity; (e) generating a set of secondary identifiers; (f) determining whether the at least one secondary play area satisfies a predetermined threshold; and (g) presenting the at least one secondary first play area.

The following detailed description illustrates embodiments of the disclosure by way of example and not by way of limitation. It is contemplated that the disclosure has application to gaming methods and systems, in general, to enable a gaming device to participate in a common progressive jackpot.

An element or step recited in the singular and preceded with the word “a” or “an” should be understood as not excluding plural elements or steps unless such exclusion is explicitly recited. Moreover, references to an “example embodiment” or “one embodiment” are not intended to be interpreted as excluding the existence of additional embodiments that also incorporate the recited features.

FIG. 1 is a schematic diagram of an example gaming machine 100 including a cabinet or frame 110, and a gaming controller 120 coupled to frame 110. In the example embodiment, frame 110 is configured to house a plurality of components, such as gaming controller 120, peripheral devices, presentation devices, and player interaction devices. For example, in the example embodiment, gaming machine 100 includes a plurality of input devices, such as a touch screen (e.g., presentation device 130) and switches and/or buttons 140 that are coupled to a front 150 of frame 110.

In the example embodiment, presentation device 130 is used to display one or more game images, symbols, and/or indicia such as a visual representation or exhibition of movement of an object (e.g., a mechanical, virtual, or video reel), dynamic lighting, video images, bingo cards, and the like. Presentation device 130 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user. For example, in the example embodiment, presentation device 130 is a touch screen device. In an alternative embodiment, presentation device 130 displays images and indicia using mechanical means. For example, presentation device 130 may include an electromechanical device, such as one or more rotatable reels, to display a plurality of game or other suitable images, symbols, or indicia.

Buttons 140 may include a “Bet One” button that enables the player to place a bet or to increase a bet, a “Bet Max” button that enables the player to bet a maximum permitted wager, a “Cash Out” button that enables the player to receive a cash payment or other suitable form of payment such as a ticket or voucher 160, which corresponds to a number of remaining credits, and/or a “Spin” button that enables rotation of physical or simulated reels of the slot machine.

In the example embodiment, gaming machine 100 includes an input/output (I/O) device 170 coupled to front 150 for accepting and/or validating cash bills, coupons, tickets and/or vouchers 160. I/O device 170 may also be capable of printing coupons, tickets and/or vouchers 160. Furthermore, in some embodiments, I/O device 170 includes a card reader or validator for use with credit cards, debit cards, identification cards, and/or smart cards. The cards accepted by I/O device 170 may include a magnetic strip and/or a preprogrammed microchip that includes a player’s identification, credit totals, and any other relevant information that may be used.

In the example embodiment, gaming controller 120 is programmed to control and/or determine at least some functions and/or operations associated with gaming machine 100. For example, in one embodiment, gaming controller 120 is configured to generate at least one gaming event. “Gaming event” may refer to one or more events associated with gaming controller 120 including, without limitation, a game start, a win, a loss, a number of consecutive wins, a number of consecutive losses, a number of credits awarded, a number of credits lost, a close win, and a close loss.

In one embodiment, gaming controller 120 randomly generates game outcomes using probability data. For example, each game outcome is associated with one or more probability values that are used by gaming controller 120 to determine the game output to be displayed. Such a random calculation may be provided by a random number generator, such as a true random number generator (RNG), a pseudo-random number generator (PNG), or any other suitable randomization process. In one embodiment, gaming controller 120 randomly draws, calls, and/or generates a plurality of numbers used to “daub” a bingo card. Gaming controller 120 may be any type of gaming machine, and may include, without limitation, different structures than those shown in FIG. 1. Moreover, gaming controller 120 may employ different methods of operation than those described below.

Figure 2:
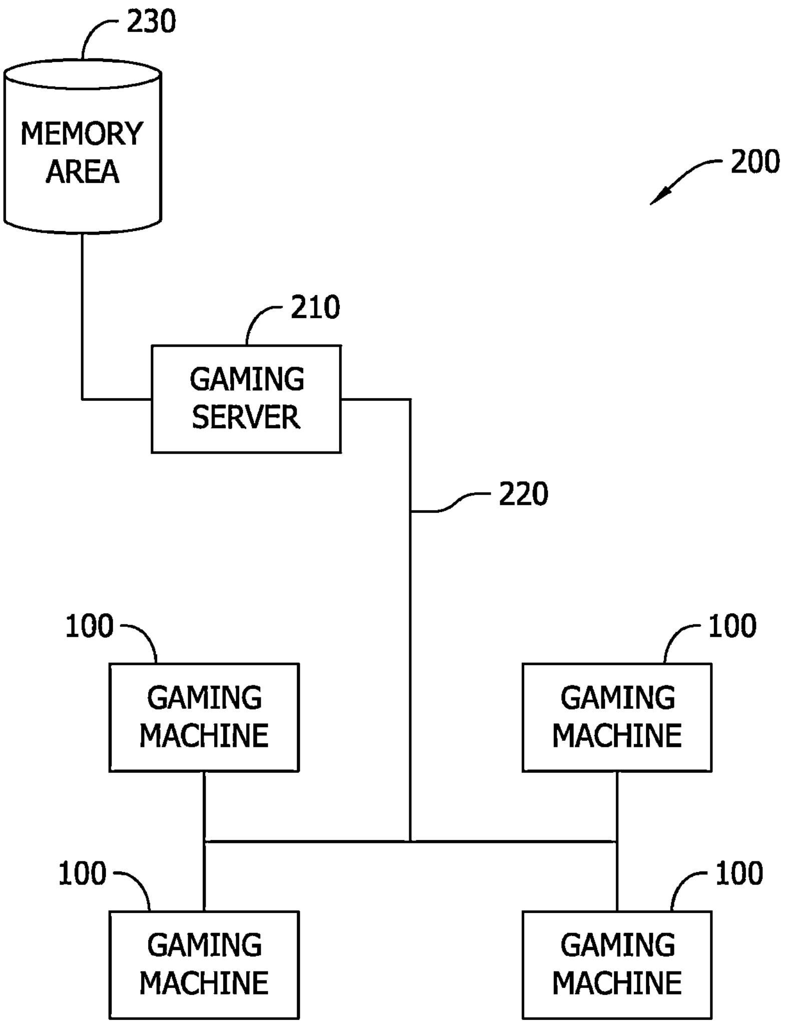

FIG. 2 is a schematic block diagram of an example gaming network 200 that includes a plurality of gaming machines 100 coupled to one or more gaming servers 210 via a communication network 220. Gaming server 210 includes a processor (not shown) that facilitates data communication between each gaming machine 100 and other components of gaming network 200. Such data is stored in, for example, a memory area 230, such as a database or a file system, which is coupled to gaming server 210.

In one embodiment, one or more gaming machines 100 may be remote gaming machines that access a casino over communication network 220. As such, a player is able to participate in a game of chance on a remote gaming machine while a player proxy is physically present at, for example, a casino or some other location. It will be understood that a player operating a remote gaming machine has virtual access to any casino coupled to communication network 220 and associated with gaming server 210. Further, while gaming machines 100 are described herein as video bingo machines, video poker machines, video slot machines, and/or other similar gaming machines that implement alternative games, gaming machines 100 may also be a personal computers coupled to the Internet or to a virtual private network such that a player may participate in a game of chance remotely. In other embodiments, the player may use a cell phone or other web enabled devices coupled to a communication network to establish a connection with a particular casino. Moreover, gaming machines 100 may be terminal-based machines, wherein the actual games, including random number generation and/or outcome determination, are performed at gaming server 210. In such an embodiment, gaming machines 100 display results of a game via presentation device 130 (shown in FIG. 1).

In one embodiment, gaming server 210 performs a plurality of functions including, for example, game outcome generation, executing a game play event for a player, player proxy selection, player tracking functions, and/or accounting functions, and data authentication functions, to name a few. However, in alternative embodiments, gaming network 200 may include a plurality of servers that separately perform these functions and/or any suitable function for use in a network-based gaming system.

Figure 3:
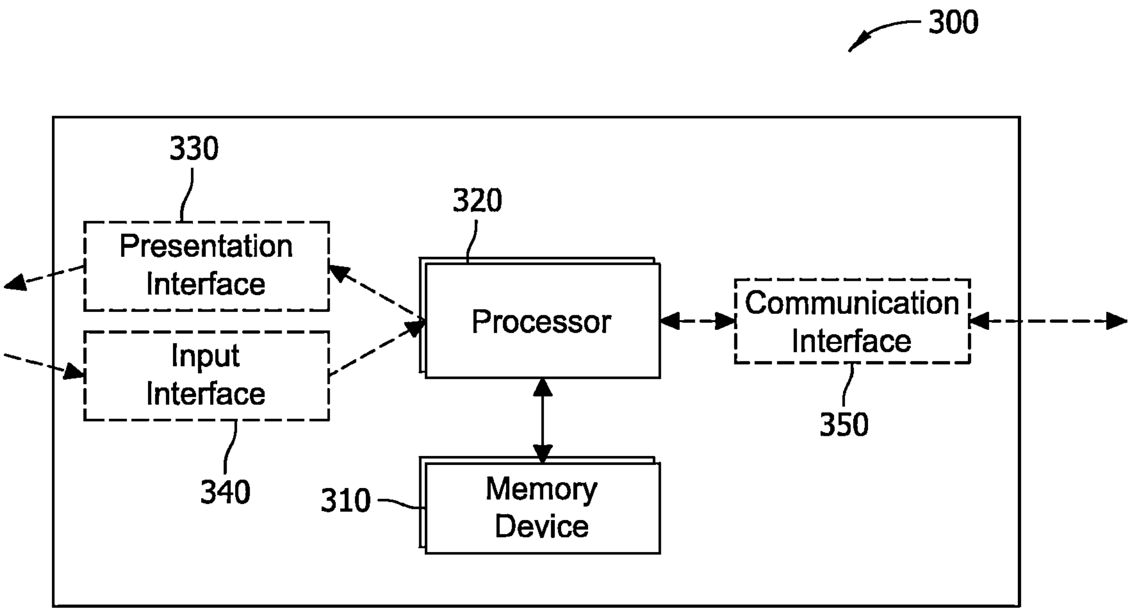

FIG. 3 is a schematic block diagram of a computing device 300, such as gaming controller 120 and/or gaming server 210. In the example embodiment, computing device 300 includes a memory device 310 and a processor 320 coupled to memory device 310 for use in executing instructions. More specifically, in the example embodiment, computing device 300 is configurable to perform one or more operations described herein by programming memory device 310 and/or processor 320. For example, processor 320 may be programmed by encoding an operation as one or more executable instructions and by providing the executable instructions in memory device 310.

Processor 320 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the example embodiment, memory device 310 includes one or more devices (not shown) that enable information such as executable instructions and/or other data to be selectively stored and retrieved. In the example embodiment, such data may include, but is not limited to, gaming information, operational data, and/or control algorithms. In the example embodiment, computing device 300 is configured to interact with the player of gaming controller 120. Alternatively, computing device 300 may use any algorithm and/or method that enable the methods and systems to function as described herein. Memory device 310 may also include one or more computer readable media, such as, without limitation, dynamic random access memory (DRAM), static random access memory (SRAM), a solid state disk, and/or a hard disk.

In the example embodiment, computing device 300 includes a presentation interface 330 that is coupled to processor 320 for use in presenting information to a user. For example, presentation interface 330 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 330 includes one or more display devices.

Computing device 300, in the example embodiment, includes an input interface 340 for receiving input from the user. For example, in the example embodiment, input interface 340 receives information suitable for use with the methods described herein. Input interface 340 is coupled to processor 320 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 330 and as input interface 340.

In the example embodiment, computing device 300 includes a communication interface 350 that is coupled to processor 320. In the example embodiment, communication interface 350 communicates with at least one remote device, such as another computing device 300. For example, communication interface 350 may use, without limitation, a wired network adapter, a wireless network adapter, and/or a mobile telecommunications adapter. A network (not shown) used to couple computing device 300 to the remote device may include, without limitation, the Internet, a local area network (LAN), a wide area network (WAN), a wireless LAN (WLAN), a mesh network, and/or a virtual private network (VPN) or other suitable communication means.

Figure 4:
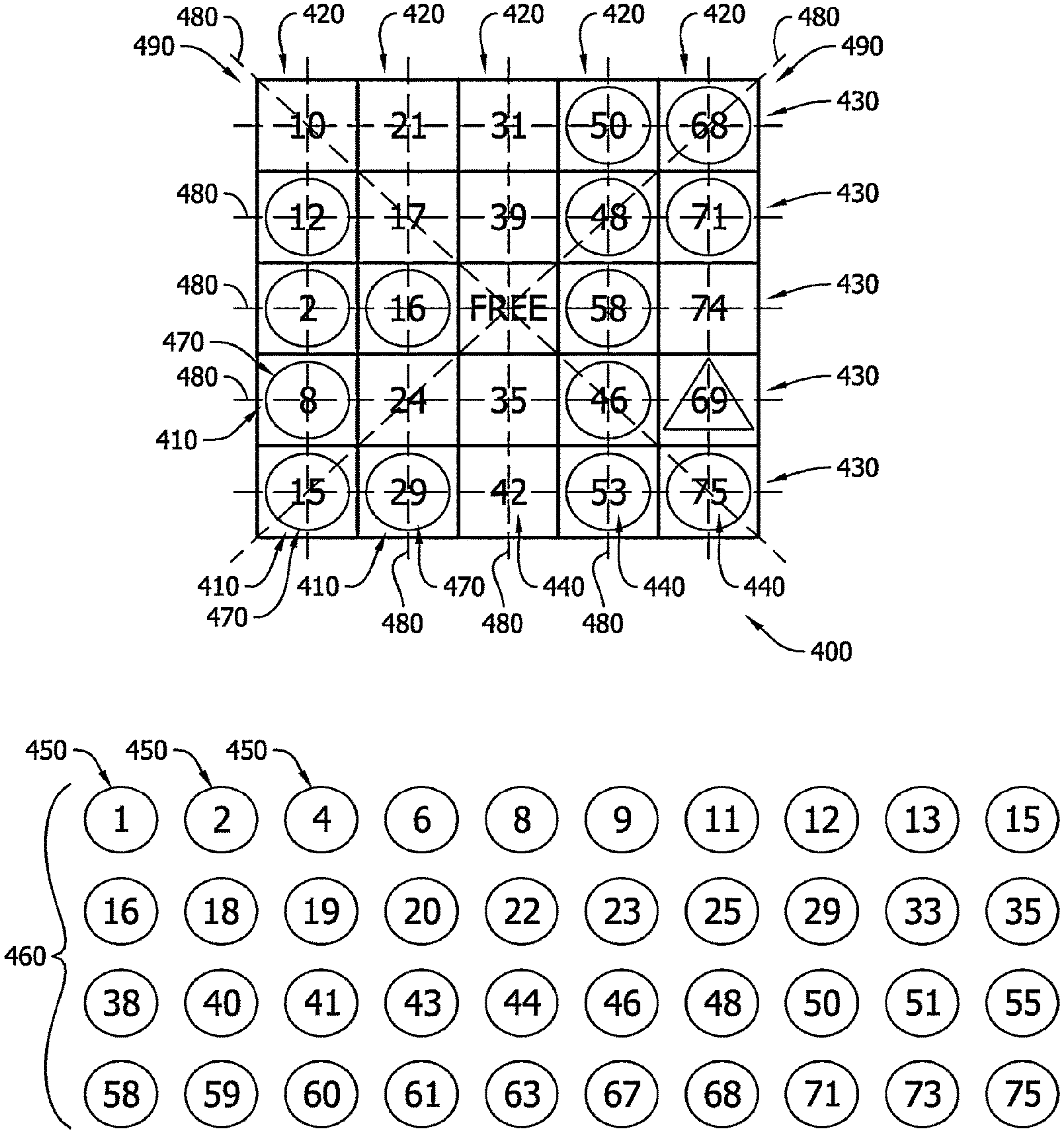

FIG. 4 shows a schematic illustration of a play area 400. As used herein, the term "play area" is used to generally describe a matrix (e.g., a bingo card) including a plurality of positions 410 arranged in a plurality of columns 420 and/or a plurality of rows 430. In the example embodiment, play area 400 is presented and/or displayed on presentation device 130 or, more broadly, gaming machine 100. Although the illustrated play area 400 includes five columns 420 and five rows 430, play area 400 may have any configuration that that enables gaming machine 100 to function as described herein.

In the example embodiment, each position 410 is associated with a respective number and/or identifier 440. Specifically, in the example embodiment, each position 410 in the first (i.e., leftmost) column 420 is associated with a respective number between 1 and 15, each position 410 in the second column 420 is associated with a respective number between 16 and 30, each position 410 in the third column 420 is associated with a respective number between 31 and 45 (with the exception of the middle position 410, described further below), each position 410 in the fourth column 420 is associated with a respective number between 46 and 60, and each position 410 in the fifth (i.e., rightmost) column 420 is associated with a respective number between 61 and 75. Moreover, in the example embodiment, each position 410 is associated with a unique identifier 440 (i.e., play area 400 does not include duplicate numbers). In the example embodiment, the middle position 410 (i.e., the position 410 in the third row 430 of the third column 420) is associated with a "FREE" or wild identifier. Alternatively, each position 410 may be associated with any identifier 440 and/or any symbols may be used that enables gaming machine 100 to function as described herein.

In the example embodiment, each position 410 associated with an identifier 440 that matches a drawn, called, or otherwise generated identifier 450 included in a set 460 of generated identifiers 450 (e.g., a "ball call") is marked or "daubed" with a marker 470. In the example embodiment, set 460 includes a predetermined quantity of identifiers 450. For example, in the example embodiment, set 460 includes forty identifiers 450. Alternatively, set 460 may include any quantity of identifiers 450 that enables gaming machine 100 to function as described herein.

In the example embodiment, the generated identifiers 450 are randomly identified and/or selected, such as by a true random number generator (RNG), a pseudo-random number generator (PNG), or any other suitable randomization process. Alternatively, the generated identifiers 450 may be selected using any method and/or system that enables gaming machine 100 to function as described herein. In the example embodiment, the middle position 410 is associated with a "FREE" or wild identifier and may be treated as being daubed with marker 470. Alternatively, each position 410 may be associated with any identifier that enables gaming machine 100 to function as described herein.

In the example embodiment, play area 400 includes a plurality of "paylines" or patterns 480 including a predetermined arrangement and/or combination of positions 410. For example, in the example embodiment, a pattern 480 may include each position 410 within a column 420, a row 430, a five-position diagonal 490, and/or a play area 400 (e.g., a "blackout" pattern). Alternatively, pattern 480 may include any arrangement and/or combination of positions 410 that enables gaming machine 100 to function as described herein.

In one embodiment, a quantity associated with patterns 480 (i.e., a number of patterns 480) are determined based on a play input. For example, in the example embodiment, a first quantity of patterns 480 are available and/or are considered in the game of chance when the play input is associated with a first bet (e.g., a single bet), and a second quantity of patterns 480 greater than the first quantity are available and/or are considered in the game of chance when the play input is associated with a second bet (e.g., a maximum permitted wager). Alternatively, a predetermined quantity of patterns 480 are available and/or are considered in the game of chance. Any quantity of patterns 480 may be considered in the game of chance that enables gaming machine 100 to function as described herein.

In the example embodiment, pattern 480 satisfies a predetermined threshold (i.e., is a "winning" pattern) when a predetermined quantity of positions 410 within pattern 480 are associated with marker 470. For example, in the example embodiment, each position 410 within the fourth column 420 is associated with first marker 470 and, thus, is determined to be a winning pattern based on first marker 470. Alternatively, any combination of positions 410 associated with any combination of markers may satisfy the predetermined threshold that enables gaming machine 100 to function as described herein.

Figure 5:
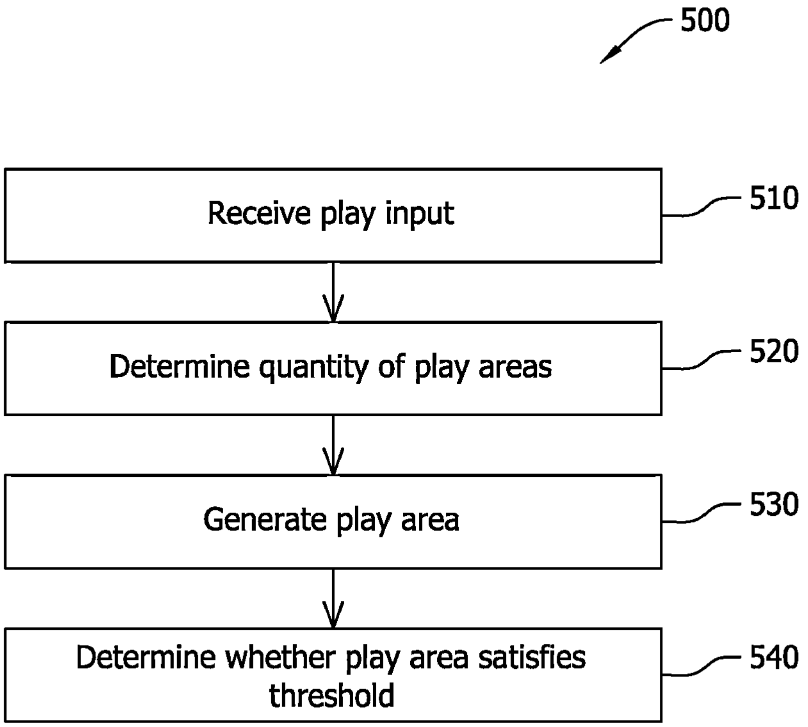

FIG. 5 is a flowchart of an example method 500 for presenting a game of chance on at least one gaming machine 100. In the example embodiment, method 500 is performed by at least one computing device including a processor and a memory, such as gaming controller 120 and/or gaming server 210. In some embodiments, one or more operations in method 500 may be performed by one or more gaming controllers 120, one or more gaming servers 210, and/or any other computing device or combination thereof.

In the example embodiment, a play input associated with a player is received 510. In the example embodiment, the play input is associated with a wager received from the player, and at least a portion of the wager is allocated to the progressive jackpot. For example, in the example embodiment, the wager includes a first portion of the wager that is allocated to a primary game, and a second portion of the wager that is allocated to a secondary game, such as a progressive jackpot game. In the progressive jackpot game, a progressive jackpot incrementally grows as the second portion is added to the progressive jackpot by gaming machines 100 linked to the progressive jackpot. Alternatively, any portion of the wager may be allocated in any manner that enables gaming machine 100 to function as described herein.

In the example embodiment, at least one primary game is presented to the player. For example, in the example embodiment, the primary game is bingo, and a bingo card (shown in FIG. 4) is presented to the player. In the example embodiment, a predetermined number of primary play areas 400 is generated and presented to the player. Alternatively, a quantity of primary play areas 400 is determined based on the wager, and the determined quantity of primary play areas are generated and presented to the player. Any number of primary play areas 400 may be generated that enables gaming machine 100 to function as described herein.

In the example embodiment, a primary set 460 of identifiers 450 are generated, and each position 410 associated with an identifier 440 that matches a generated identifier 450 is marked or "daubed." In the example embodiment, each primary play area 400 is evaluated to determine whether the primary play area satisfies a predetermined threshold (e.g., includes a "winning" pattern).

In at least some embodiments, primary play area 400 is evaluated against a plurality of predetermined thresholds. For example, in one embodiment, a first award is allocated to the player when primary play area 400 satisfies a first predetermined threshold (e.g., a row pattern), and a second award is allocated to the player when primary play area 400 satisfies a second predetermined threshold that is more difficult to satisfy than the first predetermined threshold (e.g., an "X" pattern). Alternatively, primary play area 400 may be evaluated against any predetermined threshold that enables gaming machine 100 to function as described herein.

In the example embodiment, at least one secondary game is presented to the player. For example, in the example embodiment, the secondary game is bingo, and a bingo card (shown in FIG. 4) is presented to the player. In the example embodiment, a quantity of secondary play areas 400 is determined 520 based on the wager, and the determined quantity of secondary play areas 400 are generated 530 and presented to the player.

In the example embodiment, the quantity of secondary play areas 400 is determined 520 by dividing a predetermined portion of the wager (e.g., the second portion) by a predetermined unit wager. For example, in one implementation, one bingo card is generated 530 for a $0.25 wager, and four bingo cards are generated 530 for a $1.00 wager. In at least some embodiments, the quantity of secondary play areas 400 is "triggered" and/or determined 520 based on the primary game. For example, in one embodiment, it is determined whether the primary game satisfies a predetermined threshold (e.g., includes a "winning" pattern), and the secondary play areas 400 are generated and presented to the player when the primary game satisfies the predetermined threshold. In such an embodiment, the secondary play areas 400 are not generated and/or not presented to the player when the primary game does not satisfy the predetermined threshold (i.e., the quantity of secondary play areas 400 is zero).

In the example embodiment, each secondary play area 400 generated 530 and presented to the player is unique. That is, in the example embodiment, no play area 400 presented to a player is the same as another play area 400 presented to the player. Alternatively, secondary play areas 400 are independently generated 530, such that there is a probability that duplicate secondary play areas 400 may be generated, and a player may be presented with the duplicate secondary play areas 400. Any number of secondary play areas 400 may be generated in any manner that enables gaming machine 100 to function as described herein.

In the example embodiment, a secondary set 460 of identifiers 450 are generated, and each position 410 associated with an identifier 440 that matches a generated identifier 450 is marked or "daubed." In the example embodiment, each secondary play area 400 is evaluated to determine 540 whether the secondary play area satisfies a predetermined threshold (e.g., includes a "winning" pattern), and at least a portion of the progressive jackpot is allocated to the player when secondary play area 400 satisfies the predetermined threshold. In at least some embodiments, the progressive jackpot is reset to a first predetermined value when the value of the progressive jackpot is less than a second predetermined value that is equal to or less than the first predetermined value.

In at least some embodiments, secondary play area 400 is evaluated against a plurality of predetermined thresholds. For example, in one embodiment, a first portion (e.g., a fixed amount or a relative amount) of the progressive jackpot is allocated to the player when secondary play area 400 satisfies a first predetermined threshold, and a second portion (e.g., a fixed amount or a relative amount) of the progressive jackpot is allocated to the player when secondary play area 400 satisfies a second predetermined threshold that is more difficult to satisfy than the first predetermined threshold. In such an embodiment, a $100,000 prize may be awarded to a player when secondary play area 400 satisfies a "four corners" pattern within sixty generated identifiers 450 (in which the four corners of play area 400 are daubed), and a $10,000,000 prize may be awarded to a player when secondary play area 400 satisfies a "blackout" pattern within forty generated identifiers 450 (in which every position 410 within play area 400 is daubed). Secondary play area 400 may be evaluated against any predetermined threshold that enables gaming machine 100 to function as described herein.

In some embodiments, each predetermined threshold is associated with a respective progressive jackpot. Moreover, in at least some embodiments, each predetermined threshold is associated with a respective secondary set 460 of identifiers 450, and secondary play area 400 is evaluated against the predetermined threshold based on the respective secondary set 460 of identifiers 450. In another embodiment, each predetermined threshold is evaluated against a single secondary set 460 of identifiers 450 (e.g., one ball call is evaluated for awards at multiple levels of progressives in a jackpot award).

In yet another embodiment, the secondary set 460 of identifiers 450 may also be predetermined and "roll-over" from game to game until one or more winners claim the award(s). For example, in addition to having a predetermined threshold (e.g., includes a "winning" pattern) associated with a respective progressive jackpot for a secondary play area 400, a secondary set 460 of identifiers 450 is secretly determined and held in memory 230 of gaming server 210. For each play of the primary game, the primary play area 400 is evaluated against both the predetermined threshold and the predetermined set 460 of identifiers 450. In this example, one single wager enters each player into a primary game and a secondary progressive jackpot game, simplifying the game and the player interaction. Other variations of the game mechanics (e.g., the frequency of predetermining of the winning threshold, of the identifiers 450, the generation of one or more secondary play area 400, and the like) are feasible. For instance, the set 460 of identifiers 450 and the winning threshold may be predetermined once at the start of the progressive jackpot and they roll over until the progressive jackpot is paid out. Similarly, the predetermination may take place before/during each game is commenced. In another implementation, the play area 400 may be used for both the primary game and the secondary progressive jackpot game. Alternatively, the play area 400 may be independently generated before or during commencement of each game. In yet another variation, the secondary game requires an additional wager amount.

In some embodiments, a plurality of different games of chance are presented at a plurality of gaming machines 100. The differences may be one or more combinations of game themes, game type (cards versus slots), wager denominations, payout levels, progressive jackpots, secondary games, and the like. Regardless of the game differences, the chances for each player to win the secondary progressive can be designed to ensure equitability for faster or higher denomination players by normalizing the size of each wager. For example, in some embodiments, a first play input associated with a first player is received 510 at a first gaming machine 100, and a second play input associated with a second player is received 510 at a second gaming machine 100. In at least some embodiments, a first wager associated with the first play input is a first amount, and a second wager associated with the second play input is a second amount different from the first amount.

In at least some embodiments, the secondary game is presented at the plurality of gaming machines 100. In the example embodiment, a quantity of secondary play areas 400 associated with each wager is determined 520 by dividing a predetermined portion of the wager by a predetermined unit wager. For example, in one implementation, a first quantity of secondary play areas is determined 520 and generated 530 based on the first wager, and a second quantity of secondary play areas different from the first quantity is determined 520 and generated 530 based on the second wager.

In at least some embodiments, a common or "master" secondary set 460 of identifiers 450 are generated, and each secondary play area 400 is evaluated against a plurality of predetermined thresholds based on the master secondary set 460. Alternatively, a secondary set 460 of identifiers 450 may be generated for each secondary play area 400 presented at the plurality of gaming machines 100.

One of ordinary skill in the art, guided by the teaching herein, will appreciate that one or more operations in method 500 may be performed repeatedly. For example, signals may be received repeatedly, and at least a portion of the steps described above may be performed based on each received signal.

As such, play experience for the player may be enhanced by the player based on the anticipation and/or realization that a progressive jackpot is available. The embodiments described herein facilitate equalizing the wagers, such that the probability of winning a jackpot is proportional to a size of the wager. The systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an example gaming environment, embodiments of the present disclosure are operational with numerous other general purpose or special purpose communication environments or configurations. The gaming environment is not intended to suggest any limitation as to the scope of use or functionality of any aspect of the disclosure. Moreover, the gaming environment should not be interpreted as having any dependency or requirement relating to any one or combination of components illustrated in the example operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database" refers generally to any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The present disclosure uses examples to disclose the best mode and also to enable any person skilled in the art to practice the claimed subject matter, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming system for presenting game play of a game, the gaming system comprising at least one processor executing instructions that, when executed, cause the at least one processor to:

generate a master set of identifiers for a secondary game including one or more progressive prizes, wherein a plurality of game play devices participate in the secondary game;

cause one or more secondary play areas to be displayed at a first game play device of the plurality of game play devices as part of a round of play of the secondary game;

compare the master set of identifiers with respective pluralities of identifiers of the one or more secondary play areas during a round of game play to identify matching identifiers of at least one of the one or more secondary play areas;

determine that the matching identifiers of the at least one of the one or more secondary play areas associated with the first game play device satisfies a winning pattern for the secondary game, wherein the master set of identifiers remain constant until the winning pattern is satisfied; and in response to the determination, credit the progressive prize to a credit balance associated with the first game play device.

2. The gaming system of claim 1, wherein the instructions further cause the at least one processor to, in response to an input being received at the first game play device, allocate a portion of the input to the one or more progressive prizes.

3. The gaming system of claim 2, wherein the instructions further cause the at least one processor to cause one or more secondary play areas to be displayed at a second game play device of the plurality of game play devices.

4. The gaming system of claim 3, wherein the instructions further cause the at least one processor to, in response to receiving the input from the first game play device and a second input from the second game play device, allocate respective first and second portions of the input from the first game play device and the second input from the second game play device to the one or more progressive prizes, the allocation including normalizing the first and second portions before allocation to the one or more progressive prizes.

5. The gaming system of claim 1, wherein the instructions further cause the at least one processor to identify a plurality of winning patterns associated with the secondary game, wherein each winning pattern of the plurality of winning patterns is associated with at least one progressive jackpot of a plurality of progressive jackpots.

6. The gaming system of claim 1, wherein the first game play device provides a primary game.

7. The gaming system of claim 6, wherein the master set of identifiers is further used to evaluate one or more primary play areas provided for play of the primary game.

8. The gaming system of claim 6, wherein the instructions further cause the at least one processor to generate a second master set of identifiers for the primary game, the second master set of identifiers being used to evaluate wager outcomes of the primary game and excluding the one or more progressive prizes.

9. The gaming system of claim 6, wherein the instructions further cause the at least one processor to determine a quantity of the one or more secondary play areas to display based on an outcome of the primary game.

10. A method for presenting game play of a game at a plurality of game play devices, the method comprising:

generating a master set of identifiers for a secondary game including one or more progressive prizes, wherein the plurality of game play devices participate in the secondary game;

causing one or more secondary play areas to be displayed at a first game play device of the plurality of game play devices as part of a round of play of the secondary game;

comparing the master set of identifiers with respective pluralities of identifiers of the one or more secondary play areas during a round of game play to identify matching identifiers of at least one of the one or more secondary play areas;

determining that the matching identifiers of the at least one of the one or more secondary play areas associated with the first game play device satisfies a winning pattern for the secondary game, wherein the master set of identifiers remain constant until the winning pattern is satisfied; and in response to the determination, crediting the progressive prize to a credit balance associated with the first game play device.

11. The method of claim 10, further comprising, in response to an input being received at the first game play device, allocating a portion of the input to the one or more progressive prizes.

12. The method of claim 11, further comprising causing one or more secondary play areas to be displayed at a second game play device of the plurality of game play devices.

13. The method of claim 12, further comprising, in response to receiving the input from the first game play device and a second input from the second game play device, allocating respective first and second portions of the input from the first game play device and the second input from the second game play device to the one or more progressive prizes, the allocation including normalizing the first and second portions before allocation to the one or more progressive prizes.

14. The method of claim 10, further comprising identifying a plurality of winning patterns associated with the secondary game, wherein each winning pattern of the plurality of winning patterns is associated with at least one progressive jackpot of a plurality of progressive jackpots.

15. The method of claim 10, wherein the first game play device provides a primary game.

16. The method of claim 15, wherein the master set of identifiers is further used to evaluate one or more primary play areas provided for play of the primary game.

17. The method of claim 15, further comprising generating a second master set of identifiers for the primary game, the second master set of identifiers being used to evaluate wager outcomes of the primary game and excluding the one or more progressive prizes.

18. The method of claim 15, further comprising determining a quantity of the one or more secondary play areas to display based on an outcome of the primary game.

19. One or more non-transitory computer-readable storage media having instructions stored thereon, which, when executed by at least one processor of a gaming system for presenting game play of a game, cause the at least one processor to:

generate a master set of identifiers for a secondary game including one or more progressive prizes, wherein a plurality of game play devices participate in the secondary game;

cause one or more secondary play areas to be displayed at a first game play device of the plurality of game play devices as part of a round of play of the secondary game;

compare the master set of identifiers with respective pluralities of identifiers of the one or more secondary play areas during a round of game play to identify matching identifiers of at least one of the one or more secondary play areas;

determine that the matching identifiers of the at least one of the one or more secondary play areas associated with the first game play device satisfies a winning pattern for the secondary game, wherein the master set of identifiers remain constant until the winning pattern is satisfied; and in response to the determination, credit the progressive prize to a credit balance associated with the first game play device.

20. The one or more non-transitory computer-readable storage media of claim 19, wherein the instructions further cause the at least one processor to, in response to an input being received at the first game play device, allocate a portion of the input to the one or more progressive prizes.

* * * * *